United States Patent [19]

Pacht

[11] 4,432,386
[45] Feb. 21, 1984

[54] VALVE ASSEMBLY FOR RECIPROCATING PLUNGER PUMP

[75] Inventor: Amos Pacht, Houston, Tex.

[73] Assignee: Butterworth, Inc., Houston, Tex.

[21] Appl. No.: 218,129

[22] Filed: Dec. 19, 1980

Related U.S. Application Data

[62] Division of Ser. No. 853,113, Nov. 21, 1977, Pat. No. 4,277,229.

[51] Int. Cl.³ ............................................. F16K 15/06
[52] U.S. Cl. ................................. 137/327; 137/512.3; 137/540; 137/543.19; 137/543.23
[58] Field of Search ............... 137/327, 533.13, 533.19, 137/540, 542, 543, 543.13, 543.19, 543.23, 533.31; 417/454

[56] References Cited

U.S. PATENT DOCUMENTS

| | | | |
|---|---|---|---|
| 944,330 | 12/1909 | Hudson | 137/543.23 |
| 1,116,794 | 11/1914 | Butler | 137/543.23 X |
| 1,231,506 | 6/1917 | Dick | 137/543.23 |
| 1,303,035 | 5/1919 | Crowe | 137/327 |
| 1,675,082 | 6/1928 | Aular | 137/543.23 |
| 1,796,455 | 3/1931 | Gunn | 137/533.13 X |
| 1,890,223 | 12/1932 | Kilzer | 137/543 X |
| 1,934,255 | 11/1933 | Bowler | 137/327 |
| 2,537,742 | 1/1951 | Collins | |
| 2,604,855 | 7/1952 | Towler et al. | |
| 2,649,277 | 8/1953 | Blackford | 137/543.19 X |
| 2,699,179 | 1/1955 | Hansen | 137/543.13 X |
| 3,053,500 | 9/1962 | Atkinson | 137/543.23 X |
| 3,212,280 | 10/1965 | Thomas et al. | |
| 3,220,202 | 11/1965 | Gottzmann | |
| 3,323,467 | 6/1967 | Heintz | |
| 3,348,570 | 10/1967 | Nealy | |
| 3,373,695 | 3/1968 | Yohpe | |
| 3,474,808 | 10/1969 | Elliot | 137/327 X |
| 3,524,469 | 8/1970 | Jebe | 137/543.19 |
| 3,664,371 | 5/1972 | Schneider | 137/543.19 X |
| 3,701,361 | 10/1972 | Bunn | 137/543.23 |
| 3,709,638 | 1/1973 | Iguchi et al. | |
| 3,746,483 | 7/1973 | Hindel et al. | |
| 3,811,801 | 5/1974 | Buse et al. | |
| 3,870,439 | 3/1975 | Stachowiak et al. | |
| 4,140,442 | 2/1979 | Mulvey | |

FOREIGN PATENT DOCUMENTS

| | | | |
|---|---|---|---|
| 522601 | 9/1953 | Belgium | 137/542 |
| 793057 | 4/1958 | United Kingdom | |

*Primary Examiner*—Robert G. Nilson
*Attorney, Agent, or Firm*—Hubbard, Thurman, Turner & Tucker

[57] ABSTRACT

Suction and discharge valve assemblies for a high pressure reciprocating plunger pump include generally tubular valve seat members insertable in cylindrical bores in a pump fluid end cylinder body and are in sealing engagement with the bores by cooperating o-ring members, respectively. A valve closure member has plural guide ribs projecting from a disc portion and insertable in a bore in the valve seat. Closure member guides are disposed in the respective cylinder bores and are formed with a base portion having concavely curved sides and axially extending guide arms.

6 Claims, 6 Drawing Figures

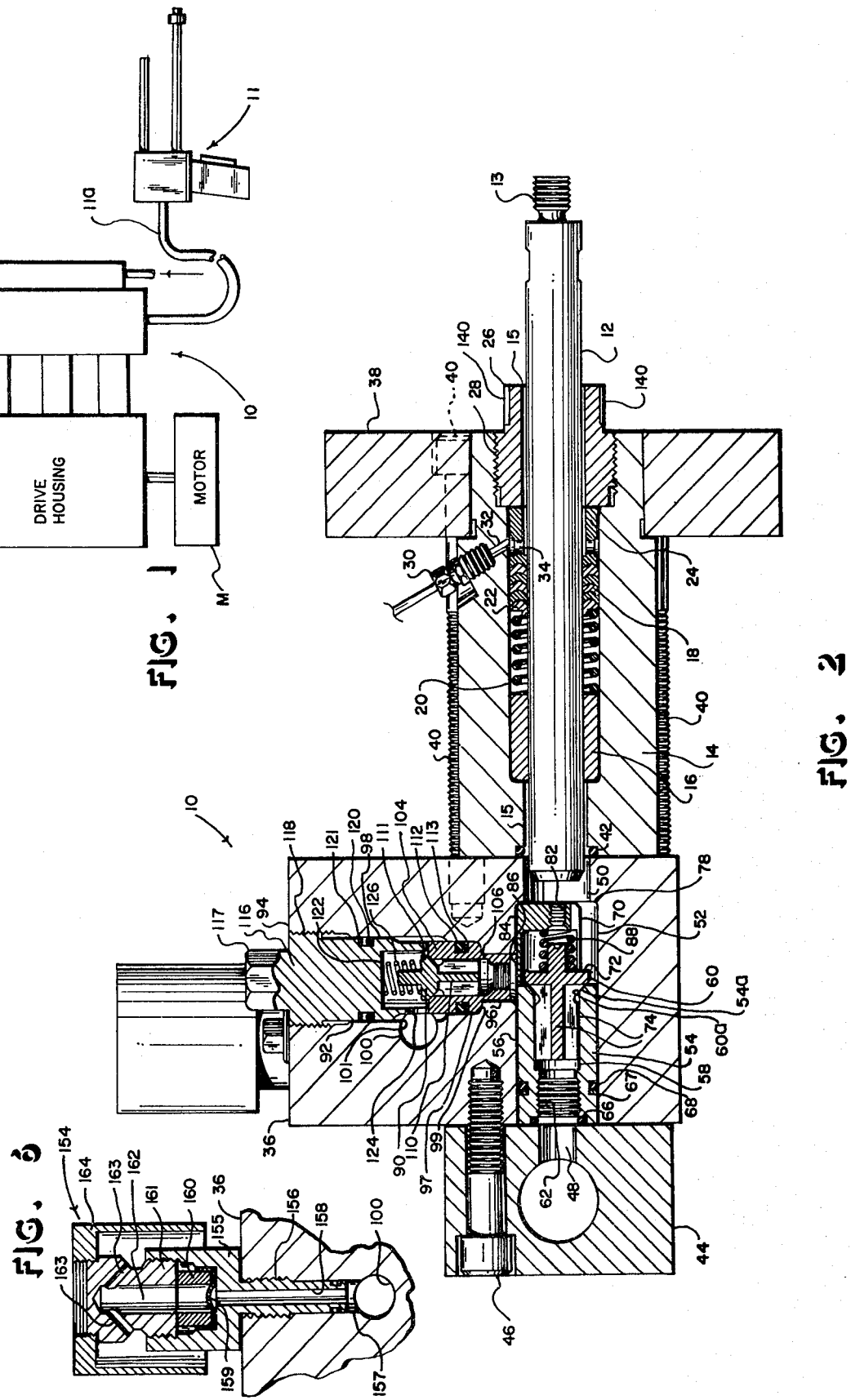

VALVE ASSEMBLY FOR RECIPROCATING PLUNGER PUMP

This application is a division of application Ser. No. 853,113, filed Nov. 21, 1977, now U.S. Pat. No. 4,277,229.

BACKGROUND OF THE INVENTION

This invention relates to a high pressure fluid delivery system having an improved reciprocating pump.

High pressure fluid delivery systems with reciprocating pumps are used to create a high pressure water jet, as for cleaning. Examples of the pumps can be found in U.S. Pat. Nos. 3,870,439 to Stachowiak et al and 3,373,695 to Yohpe. Hydraulic pressures in excess of 10,000 psi may be present in various sections of these pumps, subjecting their parts to significant stresses. Accordingly, durability and ease of maintenance when necessary are important considerations in the design of such a pump. Moreover, the high pressures require a considerable input of energy to the pump, so that it is highly desirable to increase the efficiency of the pump. As will be described below, the present pump has features which provide improved durability, maintainability and efficiency compared with existing pumps such as those of the Stochowiak et al and Yohpe patents.

SUMMARY OF THE INVENTION

In accordance with the present invention, there is provided a high pressure fluid delivery system with a reciprocating pump assembly. The pump assembly includes a fluid cylinder block with a stuffing box mounted at one side thereof and a suction manifold mounted at the other side. A cylindrical bore in the stuffing box holds a plunger sliding toward the cylinder block. A cylindrical passage extends into the fluid cylinder block from the stuffing box side thereof to receive one end of the piston. A first cylindrical chamber, of a larger diameter than the passage, extends from the passage to the suction manifold side of the fluid cylinder block. The suction manifold has a suction port leading to the chamber of the fluid cylinder block.

The suction valve is positioned in the cylindrical chamber in line between the cylindrical bore in the stuffing box and the suction port.

A second cylindrical chamber also extends perpendicular to the first cylindrical chamber, from the chamber to an outer wall of the fluid cylinder block. A first portion of the opening near the cylindrical chamber has a first diameter. A second portion, farther from the chamber than the first portion, has a second diameter, larger than the first diameter. The discharge valve is positioned in the second cylindrical chamber between the first cylindrical chamber and a discharge port.

When the piston is moved away from the fluid cylinder block, the discharge valve is closed and fluid can be drawn from the suction port through the suction valve. When the piston is moved toward the fluid cylinder block, the suction valve is closed, and fluid is driven through the discharge valve into the discharge port.

In a preferred embodiment of the invention, the suction and discharge valve seats and the suction valve guide, each have a tapped hole therein for engagement by a threaded disassembly tool for removal.

The pump structure of the present invention possesses certain advantages as compared with existing pumps such as those of the Hohpe and Stachowiak et al patents. The first advantage has to do with the forces to which the parts of the various pumps are subjected during operation.

When the plunger is driven into the fluid cylinder block, a high pressure is applied to the interior walls of the fluid cylinder block, that is, in the cylindrical opening and chamber formed in the block. In addition, the pressure is exerted on the valve seats of the suction and discharge valves and against the stuffing box, tending to force all of these away from the fluid cylinder block. In turn, the bolts and threaded connections holding the pump assemblies together are subjected to large forces.

In the pump of the present invention each of the valve seats is configured with a long, narrow shape that has a small area subject to the high fluid pressure experienced during compression. By contrast, the valve seats in the Yohpe device are broader, each having a larger area encompassed within the sealing ring associated therewith and subject to the fluid pressure. Accordingly, the valve seats of the Yohpe device are subject to larger total fluid forces than in the present pump. The contrast is even greater with respect to the pump of Stachowiak et al which has one large valve seat piece serving both the suction and discharge valves. Here the area subject to fluid pressure is greater still. As a consequence in the Stachowiak et al pump, bolts holding a manifold and the valve seat piece to the fluid cylinder block have a very large force applied to them and of necessity must be relatively large. This adds expense as well as danger of bolt breakage from over or under torquing.

In the pump of the present invention, the sealing area around the plunger, at the interface of the stuffing box and fluid cylinder block, is small as compared with conventional pumps and therefore is subject to less force tending to cause a separation of the stuffing box and fluid cylinder block at the interface. Thus, sealing problems associated with the high pressures employed are reduced substantially in the pump structure of the present invention.

The introduction of narrow valve elements, closely fitted into the chambers of the pump of the invention presents the problem of removing them if maintenance is required. IN accordance with the present invention, the valve elements may be readily removed using the threaded disassembly tool. Thus, provision for use of the disassembly tool is an important factor permitting particular valve elements to be advantageously employed in the pump of the present invention.

The present pump also exhibits improved efficiency compared with existing pumps. The relative placement of the suction valve, discharge valve and plunger succeeds in minimizing the chamber sizes in the fluid cylinder block, as compared, for example, with all the pumps shown in the Yohpe and Stachowiak, et al patents. The small sizes of these chambers result in an increased volumetric efficiency, particularly when the plunger of the pump is operated with a relatively short stroke.

The present pump has yet another advantage, in that its structure is modularized by having, as separate components, the fluid cylinder block, stuffing box and suction manifold. In case of fatigue, these can be replaced separately. In addition, they can be manufactured separately, each suited to its own requirements. For example, the suction manifold, operating at low pressure need not be made of extremely strong material.

By reducing the fatigue and sealing problems associated with prior pumps used for the high pressures for which the present pump is designed, manufacturing and maintenance problems are also reduced. Also, the arrangement of the respective valve chambers in the fluid cylinder block permits relatively easy manufacture as compared to the pumps of the prior art.

As contrasted with the prior art, the present invention does not have a separate discharge manifold attached to its fluid cylinder block. As a result, an accessory such as a pressure safety head disclosed herein can be mounted directly to the fluid cylinder block. This avoids the multiple efforts of machining the fluid cylinder block to accept a discharge manifold and machining the manifold to accept accessories.

These and other features and advantages will become apparent from a consideration of the description of the preferred embodiment which follows.

BRIEF DESCRIPTION OF THE DRAWINGS

FIG. 1 is a perspective view of a high pressure water blasting system utilizing the pump of this invention.

FIG. 2 is a cross section of a pump according to the invention.

FIG. 6 is a cross section of a pressure safety head in the pump of FIG. 2.

DESCRIPTION OF THE PREFERRED EMBODIMENT

Figure 3:
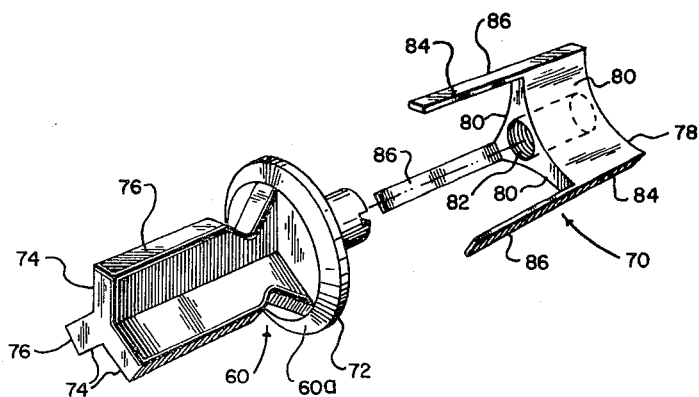
FIG. 3 is a perspective view of the suction valve and valve guide of the pump in FIG. 1.

Referring now to FIG. 1, a high pressure fluid delivery system for water blasting is illustrated as including, as is well known in the art, a high pressure pump 10 connected to a source of water (not shown) and a "dump" gun 11 connected by a hose 11a to the outlet of pump 10. High pressure water from dump gun 11 may be used, for example, to clean the surface of an object. The pump 10 is powered by a driving source M such as an electric motor or gasoline engine.

FIG. 2 shows the internal construction of a pump 10 according to the invention. In the operation of pump 10, the motion of a plunger 12 draws fluid from a suction manifold 44 and forces it into a discharge port 100. Preferably, the pump 10 has several, for example, three plungers like plunger 12, side by side, each with its associated valves, like valves 60 and 90 shown in FIG. 2. The operations of the plungers are combined by connecting all of them to force water into one common discharge port, namely port 100.

Plunger 12 has a threaded connection 13 for connection to a driving source (not shown in FIG. 2) which reciprocates the plunger along the longitudinal axis thereof. Plunger 12 moves in bore 15 of a stuffing box 14, in contact with bushing 16 and packing 18. Packing 18 is compressed by packing spring 20 pressing on front packing ring 22. Packing 18 is held in place by rear packing ring 24 (which includes a bushing surface) and packing gland 26, which is secured in stuffing box 14 by threads 28. Lubrication is provided through fitting 30, tube 32 and opening 34 in packing ring 24.

It is preferred that the support for plunger 12 in bore 15 be relatively long between the front bushing 16 and rear packing ring 24 to insure relatively long life of the plunger. For example, for a plunger having a 1" diameter and being approximately 11" long, the support between bushings is about 4".

Stuffing box 14 is mounted with one end against the side of a fluid cylinder block 36. Adapting plate 38 bears against the other end of the stuffing box. Screws 40 pass through adapting plate 38 and are screwed into fluid cylinder block 36, to hold stuffing box 14 in place. A ring seal 42 seals around the plunger 12 at the interface of stuffing box 14 and fluid cylinder block 36.

Attached to the other side of fluid cylinder block 36 is a suction manifold 44. Manifold 44 is held in place by screws 46 passing through it and fastened into fluid cylinder 36. A suction port 48 leads to fluid cylinder block 36.

In the fluid cylinder block 36, there is a cylindrical passage 50 which forms an extension of the plunger bore 15 in stuffing box 14. As illustrated in the FIGURE, one end of the plunger 12 is received into the passage 50. Coaxial with the passage 50 (and plunger bore 15), and somewhat larger in diameter than passage 50, is a cylindrical chamber 52. At the end of chamber 52, which is next to suction manifold 44 is a suction valve seat 54. The valve seat 54 is generally tubular in shape, with the outer surface 56 conforming to the wall of chamber 52. The cylindrical inner surface 58 of valve seat 54 functions as a guide for a suction valve 60 which is positioned therein as shown in FIG. 3. Near suction manifold 44, the inner surface 58 of the valve seat is tapped with threads 62. The threads 62 are used for use with disassembly tool 64 illustrated in FIG. 3 and described below. A ring seal 66 encircles a fluid flow path formed by suction port 48 and suction ring seal 68 and backup ring 67 around valve seat 54 seal between the valve seat and the wall of the chamber 52.

As illustrated in FIG. 2 valve seat 54 includes a circular tapered seating surface 54a and valve member 60 includes a circular, tapered seating surface 60a adapted to engage surface 54a in a sealing relationship as shown in FIG. 2. In accordance with the teachings of U.S. Pat. No. 3,986,523 assigned to the assignee of this invention, it is preferred that these sealing surfaces (and those on the discharge valve be described) be maintained as small as possible for the pressures employed to issue proper seating and reduce the forces required to move the valve members to and from their sealing positions.

Suction valve member 60 is shown in FIG. 3 removed from its valve seat 54. Also seen in FIG. 3 is a suction valve guide 70, which as seen in FIG. 2, fits between valve seat 54 and the end of chamber 52 that is adjacent passage 50. Both the valve 60 and guide 70 are symmetrically located with respect to the cylindrical axis of the inner surface 58 of valve seat 54. Valve 60 has a disc portion 72, perpendicular to the cylindrical axis, which stops fluid flow through valve seat 54 when the disc portion presses against the end of the valve seat. Three guide ribs 74 project from the disc portion 72 into valve seat 54. The edges 76 of the guide ribs engage inner surface 58 of valve seat 54 to guide motion of the valve 60 along its axis.

The suction valve guide 70 has a base 78 shaped by three curved sides 80. The base 78 is penetrated by a tapped hole 82 for use with the disassembly tool 64 to be described in connection with FIG. 3. When valve guide 70 is in chamber 52, vertex portions 84 of base 80 lie against the wall of the chamber. There is a substantial space between the curved sides 80 and the wall of the chamber 52, which permits fluid flow through the chamber past base 80. Fluid also flows through hole 82.

Guide arms 86 project along the wall of chamber 52 from vertex portions 84 of the base 80. As can be seen in FIG. 1, the guide arms 86 are located between the wall of chamber 52 and the disc portion 72 of suction valve 60. In this position, they bound the path of disc portion 72 of the suction valve as the valve moves back and forth in seat 54. A spring 88 between the base 80 of valve guide 70 and disc portion 72 of valve 60 urges the valve toward the closed position against the end of valve seat 54.

A discharge valve 90 and associated apparatus is installed in a cylindrical opening 92 which extends from chamber 52 to an outer wall 94 of fluid cylinder block 36, perpendicular to chamber 52. Different parts of opening 92 are of different sizes. A first portion 96, near chamber 52 has a relatively small diameter. A second portion, 97, further away from chamber 52, has a relatively larger diameter than portion 96. A third portion, 98, still further away from chamber 52, has a slightly greater diameter than portion 92. Adjacent to cylindrical opening 92 is formed the discharge port 100 of the pump. The discharge port is an open communication in the area 101 with the cylindrical opening 92.

Discharge valve 90, which is of the same general configuration as suction valve 60, is seated on discharge valve seat 104. Valve seat 104 which is generally cylindrical in shape has a part with a smaller diameter located in portion 96 of opening 92 and a larger part held against end wall 99 of portion 97. Just as the outer surface of valve seat 104 has different diameters, so does the inner surface 106. The smaller part, near chamber 52 is tapped with threads 108 for use with disassembly tool 64 of FIG. 3. The larger part of inner surface 106 holds guide ribs 110 of discharge valve 90. Discharge valve 90 is closed when the disc portion 111 thereof bears against the end of valve seat 104 which is toward outer wall 94. The interface between valve seat 104 and portion 97 of opening 92 is sealed by a sealing ring 112 and a backup ring 113 around the outer surface of the valve seat.

Holding valve seat 104 in place is a threaded discharge valve plug or cover 116. Cover 116 is fastened by threads 118 into fluid cylinder block 36 and has formed on it a hexagonal head 117 to allow removal of the cover. Sealing ring 120 and backup ring 121, around cover 116, seal the cover 116 against portion 98 of opening 92. A cylindrical cavity 122 is formed in the part of the cover 116 that bears against valve seat 104. Exit 124 provides fluid communication between the cavity 122 and discharge port 100. Thus cavity 122 is a path for fluid flow to the discharge port, while the walls of the cavity serve as a valve guide. A spring 126, between the top wall of cavity 122 and disc portion 111 of valve 90, urges the discharge valve toward its closed position.

Figure 4:
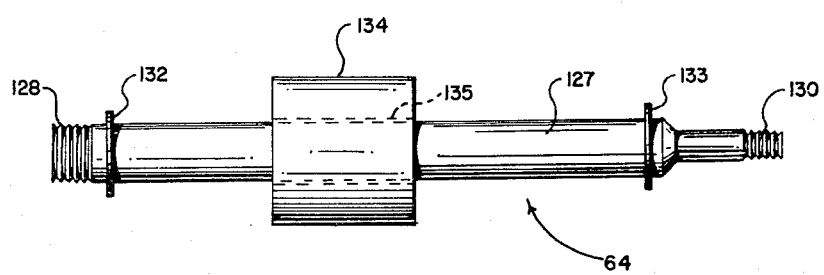
FIG. 4 is an elevation view of a disassembly tool used with the valve elements of the pump of FIG. 1.

FIG. 4 shows a disassembly tool 64 used in maintenance of the pump 10. The tool 64 has a shaft 127 with threads formed on a large end 128 thereof and a small end 130. Fixed to the shaft 127 are collars 132 and 133 near the large and the small end, respectively. Shaft 127 is fitted through a hole 135 in a bushing 134 which is free to slide along the shaft.

The disassembly tool 64 is used to remove various parts of the pump 10 as follows. To gain access to the components of the suction valve 60, suction manifold 44 is removed by removing screws 46. The larger end 128 of disassembly tool 64 is screwed into threads 62 of suction valve seat 54 to pull the valve seat from chamber 52. Bushing 134 is slid against collar 133 where the bushing may be struck with a hammer to dislodge valve seat 54 from the fluid cylinder block 36. After the valve seat has been removed, the valve 70 and spring 88 are easily withdrawn. Then the small end 130 of tool 64 may be screwed into the tapped hole 82 of suction valve guide 70 to pull the valve guide out of chamber 52. In this case, bushing 134 is slid to collar 132 where it may be impacted in order to break loose the valve guide.

To remove the parts of the discharge valve, valve cover 116 is removed by turning hexagonal head 117. Spring 126 and discharge valve 90 should then come out easily. The small end 130 of disassembly tool 64 is inserted through cylindrical opening 92 and through the interior of discharge valve seat 104, to be screwed into threads 108 of the valve seat. Bushing 134 is slid against collar 132 where it may be struck to dislodge valve seat 104 from the walls of opening 92.

Figure 5:
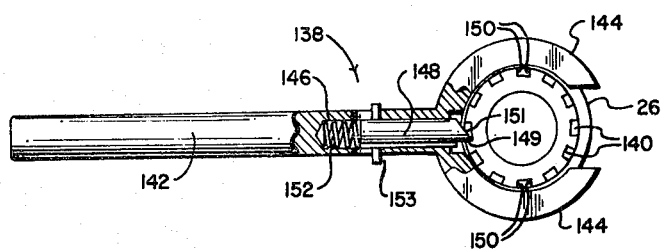
FIG. 5 is an elevation view of a disassembly tool applied to the packing gland of the pump of FIG. 2 with a section of the tool broken away.

FIG. 5 shows packing gland 26 and a tool, indicated generally by the reference numeral 138, for attaching and removing the packing gland from pump 10. As can be seen in FIG. 2, packing gland 26 is fastened into stuffing box 14 by means of threads 28. As seen in both FIGS. 2 and 5, packing gland 26 has grooves 140, spaced about the circumference of that portion thereof which protrudes from the stuffing box. These grooves are engaged by tool 138 to screw the packing gland into and out of the stuffing box.

The tool 138 includes a handle 142 with two arcuate arms 144 extending from one end. In a hollow 146 in handle 142, is a ratchet pin 148 with face 149 generally parallel to side walls 150 of a groove engaged by the tool 138. Another face 151 of pin 148 lies at an oblique angle to the groove walls 150. A spring 154 urges pin 148 against packing gland 26. Roll pins 155 engage handle 142, preventing rotation 4 ratchet pin 148 with respect to the longitudinal axis of handle 142 and also limiting the motion of pin 148 along that axis.

Tool 138 is shown as it would be used for removing packing gland 16 from the pump. Pressure can be applied to handle 142 to push it in a counter clockwise direction until face 149 of ratchet pin 148 engaged one of the sides 150 of grooves 140. Then torque can be applied through handle 142 to gland 26 via face 149 bearing on side 150 of one of the grooves 140. After handle 142 has been turned a convenient distance, it may be pulled back in the clockwise direction. In this direction of rotation, face 151 of ratchet pin 148 cams off the grooves 140, so that handle 142 may be easily turned back to a new starting position. From the new position, it is once again rotated counter-clockwise to apply torque to packing gland 26. Thus, pin 148 engages grooves 140 in a ratchet manner, allowing handle 142 to be turned through an arc which is convenient. All the while, arms 144 maintain the engagement of ratchet pin 148 with packing gland 26.

When tool 138 is applied in a reversed orientation with face 149 of pin 148 upward in the drawing, it may be used to fasten packing gland 26 to the pump. In that reverse application, torque is transmitted to the packing gland when handle 142 is rotated in the clockwise direction.

FIG. 6 shows the details of a pressure safety head, indicated generally by reference numeral 154. Head 154 includes a body 155 fastened by threads 156 into an aperture 157 in fluid cylinder block 36. Aperture 157 is in communication with discharge port 100, and conduit 158 within body 155 directs fluid from the port 100 into the safety head 154. A disc-shaped frangible partition 159 is seated in body 155 across conduit 158. Partition 159 159 is shaped to protrude outward from conduit 158. Ring 160 bears against partition 159 to hold it in place, and the ring, in turn, is held in place by plug 161 fastened by threads to body 155. A passage 162 formed in the interior of the ring 161 and plug 161 leads to downwardly directed vent tubes 163. These can be more than the two vent tubes shown distributed around passage 162. Attached to the top of plug 161 by threads is a cover or deflector or guard 164 surrounding the vent tubes 163.

Aperture 157 and conduit 158 direct high pressure fluid from discharge port 100 to partition 159. The passage 162 on the other side of partition 159 is at atmospheric pressure. With the protruding shape of partition 159, the pressure of the fluid behind it is applied more or less uniformly across the partition. The thickness of the partition is chosen so that the partition will rupture, if the pressure in conduit 158 exceeds a selected safe limit. This could happen, for example, if the discharge pathway downstream from the pump became accidentally occluded. Were the partition 159 to rupture, the fluid from the discharge port 100 would flow through conduit 158 and passage 162 and be vented through tubes 163 to the atmosphere. Guard 164 would serve to deflect and disperse the vented fluid in a downward direction to reduce the opportunity for damage and injury from the vented flow.

After a venting occurs, partition 150 can be replaced without removing safety head 154 from fluid cylinder block 36. Plug 161 can be unscrewed from the body 155, and plug 160 removed along with the ruptured partition 159 to replace it.

In the operation of the pump 10, the plunger 12 is pulled in a direction away from the fluid cylinder block 36 to draw fluid into the pump. The pressures produced by this motion of the plunger tends to pull valve 60 towards the plunger, when the force exerted by spring 88 is overcome. The discharge valve 90, aided by the force of spring 126 is closed and remains so during the suction stroke, however, valve 60 opens off seat 54. Fluid is drawn from suction port 48, through the interior of valve seat 54 and into the portion of chamber 52 occupied by valve guide 70. Fluid flows past the valve guide 70, between the curved sides 80 and the wall of chamber 52, and through the hole 82, into passage 50 and the portion of bore 15 vacated by the plunger 12.

When plunger 12 is moved toward fluid cylinder block 36, the tendency of both valves 60 and 90 is to be pushed away from the plunger. Thus, suction valve 60 is pushed closed against its valve seat 54, aided by the force of spring 88. Discharge valve 90 is forced open, away from its valve seat 104, against the force of spring 126. Fluid flows from bore 15 and passage 50, through hole 82 and the spaces between the curved sides of suction valve guide 70 and the wall of chamber 52. The fluid then flows between the guide arms 86 of suction valve guide 70, into the innter part of discharge valve seat 104, then through cavity 122 and exit 124 thereof and out the discharge port 100.

The design of pump 10 has features which result in improved efficiency. When the plunger 12 pushes againt fluid in the pump at very high pressures, there is some compression of the fluid. Since the object of the pump is to move the fluid, energy is wasted when it goes into mere compression of the fluid. More energy is wasted in this way, the more fluid that is contained in the pump.

Particularly for operation using a small stroke volume, the compression of the fluid can have a significant effect on the efficiency of the pump. In pump 10, the fluid not displaced by plunger 12 is mainly that enclosed by discharge valve seat 104 and in the portion of chamber 52 where valve guide 70 is located. That is, the fluid is in the valve parts, but does not occupy substantial spaces interconnecting the valves, as in the referenced Yohpe patent, for example. In addition, the configuration is such that plunger 12 can move to a portion immediately adjacent valve guide 70; therefore, no wasted space is associated with the plunger path. Moreover, the valve elements of pump 10 have relatively small cross sections compared with those found in conventional pumps; hence, the volume of fluid contained in these elements is relatively small.

Some of the improvements provided by pump 10 relate to stresses on the parts of the pump during operation. The present pump is designed to provide as small as possible to be exposed to the high pressures without imposing flow restrictions that would be detrimental to the operation of the pump. For example, when the plunger 12 is driven into fluid cylinder block 36, pressures in the range of 13,000 and 15,000 psi may be experienced in pa-sage 50, chamber 52 and cylindrical opening 92. This pressure is exerted on suction valve seat 54, discharge valve seat 104 and stuffing box 14, tending to force all of these away from fluid cylinder block 36. The force on suction valve seat 54 is, in turn, exerted against suction manifold 44 and screws 46. Part of the force on discharge valve seat 104 is transmitted to discharge valve cover 116. The hydraulic force on stuffing box 14 is carried by screws 40. Thus, by minimizing the sealing the sealing areas within which the forces referred to are applied, (as represented by seals 42, 66, 67, 112 and 120), the present invention effectively reduces the stresses on the mounting bolts and other parts of the pump.

Compared with the valve seats of conventional pumps, valve seats 54 and 104 are configured with a relatively long and narrow shape that exposes only a relatively small area to the high fluid pressure. A preferred value for the diameter of the suction valve seat 54 at ring seal 66 is 1⅜ inches. The diameter of discharge valve seat 104 at sealing ring 112 is 1¼ inches, while the diameter of discharge valve cover 116 at sealing ring 120 is 1⅜ inches. The outer diameter of ring seal 42 around plunger 12 is about 1⅜ inches. The outer diameter of ring seal 42 around plunger 12 is about 1⅜ inches.

The force exerted on one of the parts, such as one of the valve seats, is the product of the hydraulic pressure and the area subject to the pressure. Therefore, a part having a smaller area exposed to the pressure is subject to a smaller total force. For example, in the case of the suction valve seat 54, a smaller force is transmitted from the inside of chamber 52 to the suction manifold 44 and to screws 46.

The design of pump 10 achieves quite a dramatic decrease in the forces exerted on its parts, compared to conventional pumps. For example, a pump manufactured according to the Hohpe patent referred to above, operating at 10,000 psi hydraulic pressure requires that the fastening screws be tightened with 200–300 ft. lbs. of torque. By contrast, pump 10 can operate at 20,000 psi, with the screws 40 and 46 requiring only to be tightened to 50 ft. lbs. of torque. As a result, less and easier maintenance is required of pump 10, and fewer failures may be expected. Also, smaller and cheaper bolts can be used and danger from bolt rupture is reduced.

The discharge valve cover 116 is subjected to different forces than the discharge valve seat 104. This is because of the pressures in cavity 122 which result from the connection of pump 10 to leads such as gun 11 in FIG. 1. Discharge valve seat 104 is subjected to a pulsating pressure with a peak in the 13,000 to 15,000 psi range, for example. Under these conditions, the peak pressure on discharge valve cover 116 would be perhaps 11,000 psi, and the pressure on the cover would be composed of a constant component and a smaller, pulsating component. It is satisfactory for valve cover 116 to be designed with a somewhat larger cross section than the discharge valve seat 104, because the pressure on the cover is smaller and because it is a steadier pressure which results in less fatigue of the parts than the pulsating pressure.

The pump 10 has additional advantages relating to construction, durability and maintenance, matters of considerable importance for high pressure pumps. Both the suction manifold 44 and the stuffing box 14 can be manufactured separately from fluid cylinder block 36, thus reducing cost. All can be more easily drilled and machined as compared to the prior art pumps discussed. Suction manifold 44 and stuffing box 14 are further simplified, in that screws 46 and 40 pass through the manifold and box, respectively, and do not require corresponding threads to be machined into these elements. Suction manifold 44 is subjected to sufficiently low stresses that it may be manufactured of aluminum, rather than steel.

Also, by separating the suction manifold from the fluid cylinder block, there is no need to machine a large suction hole and pipe threads in the fluid cylinder block as is necessary in some of the prior art pumps. This makes the fluid cylinder blick cheaper to manufacture and subjects it to less stress. Also, by separating these parts, the suction manifold can be used as a clamp to hold in the suction valve parts and they (and the discharge valve parts) can be easily removed in the field without having to untorque and retorque the bolts mounting the fluid cyklinder head and the stuffing box together.

The use of disassembly tool 64 renders straightforward the removal of the valve elements for maintenance. Importantly, it makes possible the use of the relatively elongated valves, valve seats and valve guides in closely fitted and relatively small diameter, cylindrical chambers and openings. Such elements are difficult to reach in chamber 52 and opening 92, but they may be readily removed with tool 64.

Although preferred embodiments of the invention have been described in detail, it is to be understood that various changes, substitutions and alterations can be made therein without departing from the spirit and scope of the invention as defined by the appended claims.

I claim:

1. A valve assembly adapted to be inserted in a cylindrical valve chamber in a cylinder block of a reciprocating high pressure pump and retained in said chamber by a manifold member removably secured to said cylinder block, said valve chamber having a shoulder formed by said block at the inner end of said chamber, said valve assembly comprising:

an elongated cylindrical tubular valve seat member adapted to be slidably insertable in said chamber and retained in said chamber by said manifold member, said seat member having a bore extending longitudinally therethrough and including a threaded portion for engagement with a disassembly tool to remove said seat member from said valve chamber, and a valve seat surface formed at the inner end of said bore;

a valve member including a cylindrical disc portion engageable with said surface on said seat member for closing off fluid flow through said bore, said valve member including a pluraity of longitudinal guide ribs projecting from said disc portion and insertable in said bore for guiding said disc portion for reciprocation with respect to said seat member to open and close said valve;

a valve guide member including a base portion and a plurality of circumferentially spaced apart arms which extend longitudinally from said base portion and are adapted to engage a transverse end face of said seat member around said disc portion, said base portion including a plurality of concave exterior wall surface portions between said arms and forming recesses to permit the flow of fluid through said chamber from said bore, said base portion extending to engagement with said shoulder in said chamber whereby said guide member is retained in said chamber by being clamped between said shoulder and said seat member, said guide member including a central threaded bore in said base portion for engagement with a disassembly tool to remove said guide member from said bore; and spring means disposed between said base portion and said valve member and adapted to bias said valve member in the valve closed position against said seat member.

2. The valve assembly set forth in claim 1 wherein:

said seat member includes a circumferential groove formed thereon, and resilient seal ring means disposed in said groove and adapted to engage the sidewall of said chamber to form a seal between said chamber and the exterior of said cylinder block.

3. A valve assembly adapted to be inserted in a cylindrical valve chamber in a cylinder block of a reciprocating high pressure pump and retained in said chamber by a manifold member, said valve chamber having a shoulder formed by said block at the inner end of said chamber, said valve assembly comprising:

an elongated cylindrical tubular valve seat member adapted to be slidably insertable in said chamber, said seat member having a bore extending longitudinally therethrough, a circular valve seat surface formed at one end of said bore, and a circumferential groove formed in said seat member for receiving a resilient seal ring engageable with the sidewall of said chamber to form a seal between said chamber and said manifold member;

a valve member including a cylindrical disc portion engageable with said surface on said seat member for closing off fluid flow through said bore, said valve member including a plurality of longitudinal guide ribs projecting from said disc portion and insertable in said bore for guiding said disc portion for reciprocation with respect to said seat member to open and close said valve, each of said guide ribs including a recessed portion adjacent the juncture of said guide ribs with said disc portion to provide flow of fluid between said seat surface and said disc portion adjacent said guide ribs and circumferentially around said disc portion and said seat surface;

a valve guide member including a base portion and a plurality of circumferentially spaced apart arms which extend longitudinally from said base portion and are adapted to engage said seat member around said disc portion, said base portion including a plurality of concave exterior wall surface portions between said arms and forming recesses to permit the flow of fluid through said chamber from said bore, said base portion extending to engagement with said shoulder of said bore whereby said guide member is retained in said chamber between said shoulder and said seat member, said guide member including means on said base portion for engagement with a disassembly tool to remove said guide member from said bore; and spring means disposed between said base portion and said valve member and adapted to bias said valve member in the valve closed position against said seat member.

4. A valve guide member adapted for use with a valve assembly for a high pressure reciprocating pump having a cylinder block with a cylindrical valve chamber therein and delimited at an inner end by a transverse shoulder, said guide member including:

a base portion having opposed substantially flat wall surfaces, one of said wall surfaces being engageable with said shoulder and the other of said wall surfaces being supportive of a closure spring for a valve member of said valve assembly;

said base portion being positioned perpendicular to the cylindrical axis of said chamber and having three concave curved sides symmetrically disposed with respect to said axis to form fluid flow passages through said chamber between said base portion and said sidewall, said concave curved sides having interposed therebetween three vertex portions at the sidewall of said chamber;

three guide arms each extending from one of the vertex portions of said base portion along said sidewall to engage a valve seat member of said valve assembly, said guide member being adapted to be retained in said chamber solely by being clamped between said shoulder and said valve seat; and a threaded hole in said base portion opening through said opposed walls of said base portion and substantially coaxial with said axis of said chamber for engagement of said valve guide by a cooperating externally threaded portion of a disassembly tool for removing said valve guide from said chamber.

5. A valve assembly adapted to be inserted in a cylindrical valve chamber in a cylinder block of a reciprocating high pressure pump and retained in said chamber by a manifold member removably secured to said cylinder block, said valve chamber having a shoulder formed by said block at the inner end of said chamber, said valve assembly comprising:

an elongated cylindrical tubular valve seat member adapted to be slidably insertable in said chamber and retained in said chamber by said manifold member, said seat member having a bore extending longitudinally therethrough and including a threaded portion for engagement with a disassembly tool to remove said seat member from said valve chamber, and a valve seat surface formed at the inner end of said bore;

a valve member including a cylindrical disc portion having a circumferential chamfered angular seat engageable with said seat surface on said seat member for closing off fluid flow through said bore, and three equally spaced longitudinal guide ribs projecting from said disc portion and insertable in said bore for guiding said disc portion for reciprocation with respect to said seat member, each of said guide ribs including a generally "v"-shaped notch adjacent its juncture with said seat of said disc portion, said notch having a first inclined flat portion forming a surface extension for said seat of said disc portion and a second substantially flat portion, whereby unobstructed substantially uniform circumferential flow of fluid will occur between said seat surface and said disc portion adjacent said guide ribs when said valve member is displaced from its associated seat member;

a valve guide member including a base portion and a plurality of circumferentially spaced apart arms which extend longitudinally from said base portion and are adapted to engage a transverse end face of said seat member around said disc portion, said base portion including a plurality of concave exterior wall surface portions between said arms and forming recesses to permit the flow of fluid through said chamber from said bore, said base portion extending to engagement with said shoulder in said chamber whereby said guide member is retained in said chamber by being clamped between said shoulder and said seat member, said guide member including a central threaded bore in said base portion for engagement with a disassembly tool to remove said guide member from said bore; and spring means disposed between said base portion and said valve member and adapted to bias said valve member in the valve closed position against said seat member.

6. A valve assembly adapted to be inserted in a cylindrical valve chamber in a cylinder block of a reciprocating high pressure pump and retained in said chamber by a manifold member, said valve chamber having a shoulder formed by said block at the inner end of said chamber, said valve assembly comprising:

an elongated cylindrical tubular valve seat member adapted to be slidably insertable in said chamber, said seat member having a bore extending longitudinally therethrough, a circular valve seat surface formed at one end of said bore, and a circumferential groove formed in said seat member for receiving a resilient seal ring engageable with the sidewall of said chamber to form a seal between said chamber and said manifold member;

a valve member including a cylindrical disc portion having a circumferential chamfered angular seat engageable with said seat surface on said seat member for closing off fluid flow through said bore, and three equally spaced longitudinal guide ribs projecting from said disc portion and insertable in said bore for guiding said disc portion for reciprocation with respect to said seat member, each of said guide ribs including a generally "v"-shaped notch adjacent its juncture with said seat of said disc portion, said notch having a first inclined flat portion forming a surface extension for said seat of said disc portion and a second substantially flat portion, whereby unobstructed substantially uniform circumferential flow of fluid will occur between said seat surface and said disc portion adjacent said guide ribs when said valve member is displaced from its associated seat member;

a valve guide member including a base portion and a plurality of circumferentially spaced apart arms which extend longitudinally from said base portion and are adapted to engage said seat member around said disc portion, said base portion including a plurality of concave exterior wall surface portions between said arms and forming recesses to permit the flow of fluid through said chamber from said bore, said base portion extending to engagement with said shoulder of said bore whereby said guide member is retained in said chamber between said shoulder and said seat member, said guide member including means on said base portion for engagement with a disassembly tool to remove said guide member from said bore; and spring means disposed between said base portion and said valve member and adapted to bias said valve member in the valve closed position against said seat member.

* * * * *

UNITED STATES PATENT AND TRADEMARK OFFICE
CERTIFICATE OF CORRECTION

PATENT NO. : 4,432,386
DATED : February 21, 1984
INVENTOR(S) : Amos Pacht

Page 1 of 3

It is certified that error appears in the above-identified patent and that said Letters Patent is hereby corrected as shown below:

Column 1, line 68, change "Hohpe" to --Yohpe--.

Column 2, line 44, change "IN" to --In--.

Column 3, line 19, change "perspective view" to --schematic diagram--.

Column 4, line 42, after "valve" insert --to--.

line 64, change "80" to --78--.

line 68, change "80" to --78--.

Column 5, line 2, change "80" to --78--.

line 7, change "80" to --78--.

line 22, change "an" to --in--.

Column 6, line 2, change "70" to --60--.

line 32, change "154" to --152--.

line 33, change "155" to --153--.

line 34, change "4" to --of--.

line 40, change "engaged" to --engages--.

UNITED STATES PATENT AND TRADEMARK OFFICE
CERTIFICATE OF CORRECTION

PATENT NO. : 4,432,386
DATED : February 21, 1984
INVENTOR(S) : Amos Pacht

It is certified that error appears in the above-identified patent and that said Letters Patent is hereby corrected as shown below:

Column 7, line 1, delete "159" (second occurrence).

line 5, change "161" (first occurrence) to --160--.

line 6, change "These" to --There--.

line 28, change "150" to --159--.

line 31, change "plug" to --ring--.

line 57, change "innter" to --inner--.

Column 8, line 19 and 20, change "provided as small as possible to be" insert --reduce the area--.

line 20, after "pressures" insert --as much as possible--.

line 25, change "pa-sage" to --passage--.

line 33, delete "the sealing".

line 47, delete "The outer diame-".

UNITED STATES PATENT AND TRADEMARK OFFICE
CERTIFICATE OF CORRECTION

PATENT NO. : 4,432,386
DATED : February 21, 1984
INVENTOR(S) : Amos Pacht

It is certified that error appears in the above-identified patent and that said Letters Patent is hereby corrected as shown below:

Column 8, line 48, delete "ter of ring seal 42 around plunger 12 is about 1-3/8 inches."

line 60, change "Hohpe" to --Yohpe--.

Column 9, line 35, change "blick" to --block--.

line 41, change "cyklinder" to --cylinder--.

Signed and Sealed this

Twenty-sixth Day of February 1985

[SEAL]

Attest:

DONALD J. QUIGG

Attesting Officer     Acting Commissioner of Patents and Trademarks